US007975053B2

(12) United States Patent
Poplett et al.

(10) Patent No.: US 7,975,053 B2
(45) Date of Patent: Jul. 5, 2011

(54) ESTABLISHING NETWORK POLICY FOR SESSION-UNAWARE MOBILE-DEVICE APPLICATIONS

(75) Inventors: John Harlan Poplett, River Forest, IL (US); Claudio Giovanni Taglienti, Barrington Hills, IL (US); Michael Irizarry, Algonquin, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 1050 days.

(21) Appl. No.: 11/618,216

(22) Filed: Dec. 29, 2006

(65) Prior Publication Data

US 2008/0162704 A1  Jul. 3, 2008

(51) Int. Cl.
*G06F 15/16* (2006.01)
(52) U.S. Cl. ........................................ 709/226; 709/200
(58) Field of Classification Search ...... 9/228; 709/228, 709/200–203, 217–227
See application file for complete search history.

(56) References Cited

U.S. PATENT DOCUMENTS

| | | | |
|---|---|---|---|
| 7,076,552 B2 | 7/2006 | Mandato | |
| 7,106,756 B1 | 9/2006 | Donovan et al. | |
| 7,333,464 B2 * | 2/2008 | Yang et al. | 370/338 |
| 7,516,478 B2 * | 4/2009 | Limont et al. | 726/1 |
| 7,751,377 B2 * | 7/2010 | Yang et al. | 370/338 |
| 2003/0169713 A1 * | 9/2003 | Luo | 370/338 |
| 2004/0088567 A1 * | 5/2004 | Lamotte | 713/200 |
| 2004/0143671 A1 * | 7/2004 | Idnani | 709/230 |
| 2004/0204073 A1 * | 10/2004 | Yanosy | 455/557 |
| 2005/0025132 A1 * | 2/2005 | Harper et al. | 370/352 |
| 2006/0291439 A1 * | 12/2006 | Yang et al. | 370/338 |
| 2007/0110055 A1 * | 5/2007 | Fischer et al. | 370/389 |
| 2007/0160014 A1 * | 7/2007 | Larsson | 370/338 |
| 2007/0177554 A1 * | 8/2007 | Yang et al. | 370/338 |
| 2008/0170563 A1 * | 7/2008 | Zhu et al. | 370/352 |
| 2008/0240087 A1 * | 10/2008 | Goodman | 370/354 |

\* cited by examiner

*Primary Examiner* — Moustafa M Meky
(74) *Attorney, Agent, or Firm* — Leydig, Voit & Mayer, Ltd.

(57) ABSTRACT

The present invention provides the benefits of negotiated network resources to session-unaware applications. When a session-unaware application runs on a mobile device, the device, knowing that the application is session-unaware, negotiates appropriate network-policy parameters for the application. The application remains unaware, but it receives the benefits of the network-policy parameter negotiation. The network-policy parameter negotiation is carried on between the mobile device and a "network policy mediator" in the network. Together, they reserve the appropriate network resources and secure the appropriate guarantees. In some embodiments, a software "shim" runs in the network-protocol stack on the mobile device. By intercepting network-access attempts sent by the session-unaware application, the shim knows to begin the network-policy parameter negotiation. In some embodiments, the mobile device downloads information about session-unaware applications from the network. This information includes a list of which network-policy parameter guarantees would be most beneficial to each application.

23 Claims, 7 Drawing Sheets

FIG. 4

Network-Policy Parameter Database 212

| Key Values 400 | | | | Network-Policy Parameters 402 | |
|---|---|---|---|---|---|
| Application 404 | Protocol 406 | Port 408 | | Bandwidth 410 | QoS Category 412 |
| Application #1 | TCP | Any | | 16k | Assured Forwarding |
| Application #1 | UDP | Any | | 128k | Expedited Forwarding |
| Application #2 | Any | Any | | 128k | Assured Forwarding |
| Application #3 | Any | Any | | 0k | Not Allowed |
| Default | Any | Any | | 16k | Best Effort |

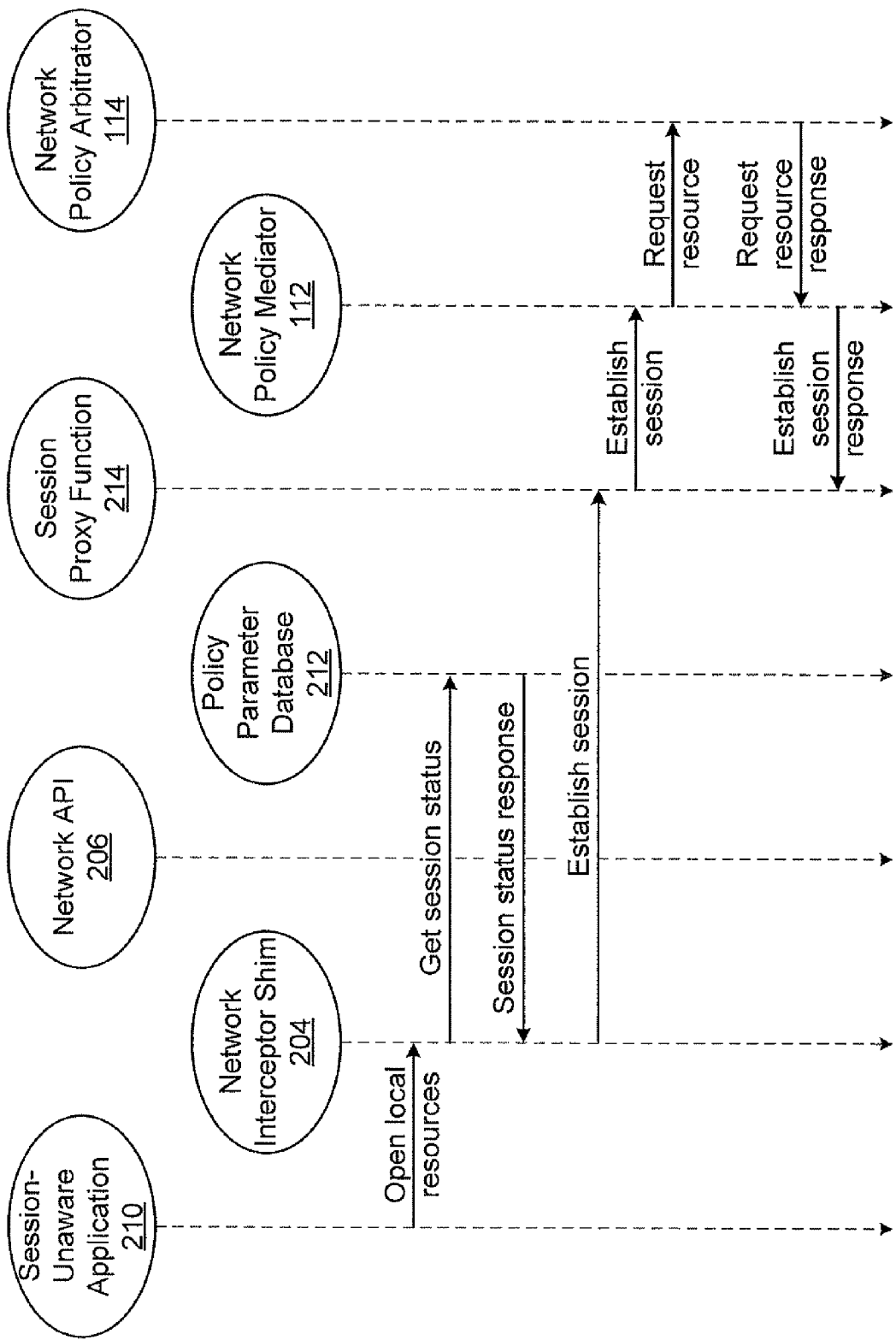

ESTABLISHING NETWORK POLICY FOR SESSION-UNAWARE MOBILE-DEVICE APPLICATIONS

FIELD OF THE INVENTION

The present invention relates generally to wireless communications, and, more particularly, to establishing parameters for a wireless communications session.

BACKGROUND OF THE INVENTION

Many communication applications require specific levels of support from their network carriers. Required support parameters can include, for example, minimum bandwidth, maximum latency, and reliability of data-packet delivery. These support parameters are generally called quality-of-service ("QoS") parameters or network-policy parameters. Some networks can issue network-policy parameter guarantees for their ability to support specific traffic requirements. Network-policy parameter guarantees are implemented in a network by allocating scarce resources to application traffic in a manner that meets the applications' support requirements. For example, a congested network element queues the traffic of applications that are tolerant of latency while transmitting latency-sensitive traffic without delay. When the congestion clears, the queued traffic is sent.

Most applications can benefit from negotiating to reserve network resources and from securing network-policy parameter guarantees when they start up. Some applications, however, are "session unaware," that is, they were not developed with the ability to negotiate for network resources, even though their performance would benefit from a guaranteed level of service.

A session-unaware application running on a mobile device may provide unacceptable performance. Simply preventing such an application from running on the mobile device, however, may also be unacceptable.

BRIEF SUMMARY OF THE INVENTION

In view of the foregoing, the present invention provides the benefits of negotiated network resources to session-unaware applications. When a session-unaware application runs on a mobile device, the device, knowing that the application is session-unaware perhaps by consulting a local database), negotiates appropriate network-policy parameters for the application. The application remains unaware, but it receives the benefits of the network-policy parameter negotiation.

The network-policy parameter negotiation is carried on between the mobile device and a "network policy mediator" in the network. Together, they reserve the appropriate network resources and secure the appropriate guarantees. The data streams to and from the session-unaware application, however, do not terminate at the network policy mediator.

In some embodiments, a software "shim" runs in the network-protocol stack on the mobile device. By intercepting network-access attempts sent by the session-unaware application, the shim knows to begin the network-policy parameter negotiation.

In some embodiments, the mobile device downloads information about session-unaware applications from the network. This information includes a list of which network-policy parameters would be most beneficial to each application.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIG. 4 is a table of potential network-policy parameters for mobile applications;

FIGS. 6a and 6b taken together are an information-flow diagram of a network-policy parameter negotiation performed for the benefit of a session-unaware application.

DETAILED DESCRIPTION OF THE INVENTION

Figure 1:
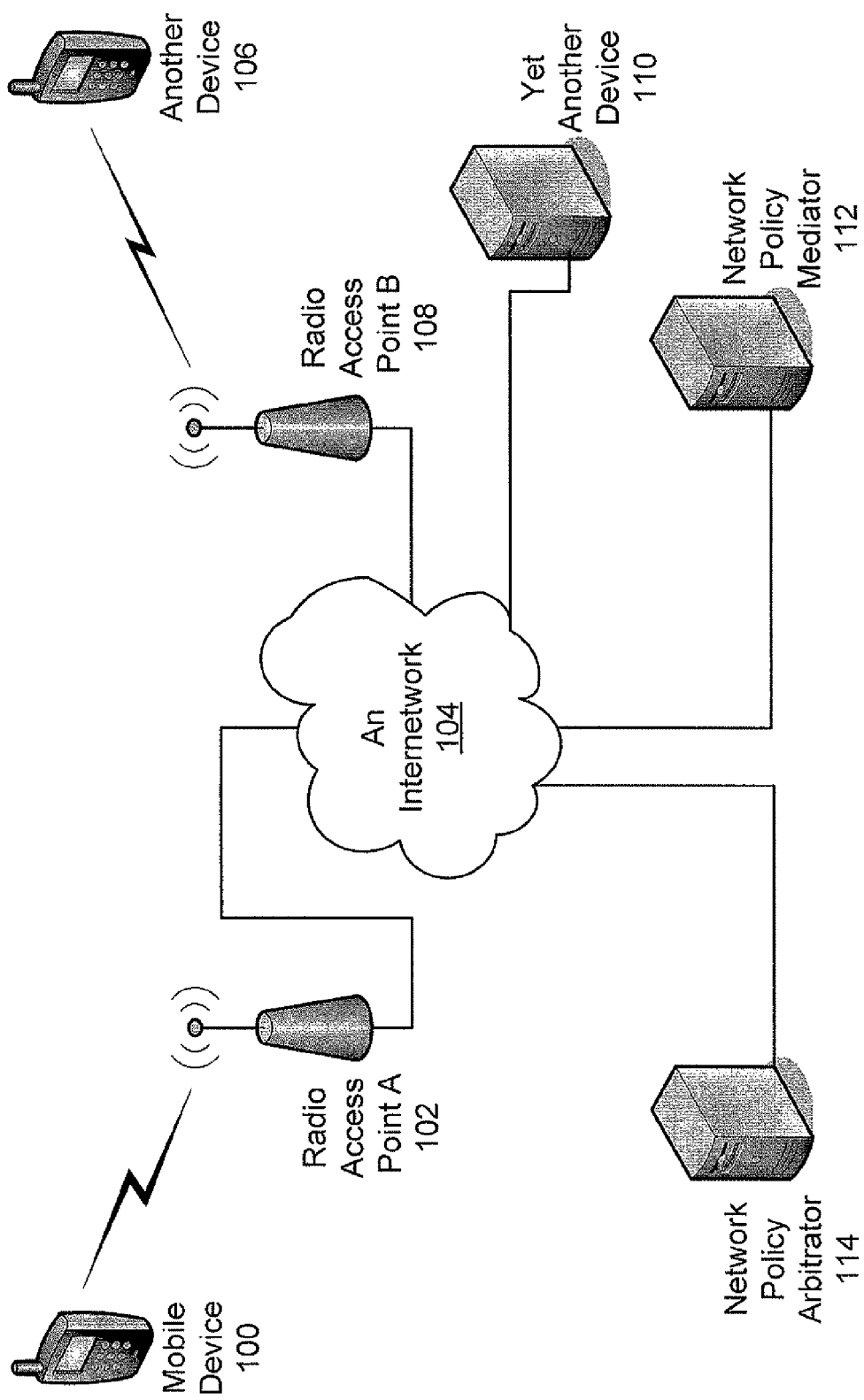
FIG. 1 is a network diagram showing a mobile device communicating with another device and with a network policy mediator, which later communicates in turn with a network policy arbitrator.

Turning to the drawings, wherein like reference numerals refer to like elements, the present invention is illustrated as being implemented in a suitable environment. The following description is based on embodiments of the invention and should not be taken as limiting the invention with regard to alternative embodiments that are not explicitly described herein.

FIG. 1 presents the devices in one embodiment of the present invention. A mobile device 100 communicates via wireless to a Radio Access Point A 102. While shown in FIG. 1 as a cellular telephone, the mobile device 100 can be any wireless-equipped device capable of running an application such as, for example, a laptop computer or a personal digital assistant.

Through the Radio Access Point A 102, the mobile device 100 can communicate with many other devices through an internetwork 104. The internetwork 104 can include other wireless links, wired links, the Public Switched Telephony Network, and the Internet.

In the scenario of FIG. 1, the mobile device 100 communicates with another mobile device 106. The other device 106 may communicate via wireless to a Radio Access Point B 108 and thus to the internetwork 104. In some circumstances, the other mobile device 106 may communicate directly with the mobile device 100 (without the intervening internetwork 104). Depending upon the application it is running, the mobile device 100 can communicate with a non-mobile device 110, such as a wired telephone or a computing server, instead of, or in addition to, another mobile device 106. The present invention is not limited by the nature of the devices with which the mobile device 100 communicates.

As discussed in greater detail below, when the mobile device 100 runs a session-unaware application, the mobile device 100 communicates with a network policy mediator 112 in order to request network-policy parameters on behalf of that session-unaware application. The network policy mediator 112 in turn negotiates the parameters with a network policy arbitrator 114 that makes the final decisions about which policy parameters are to be supported in a session.

Figure 2:
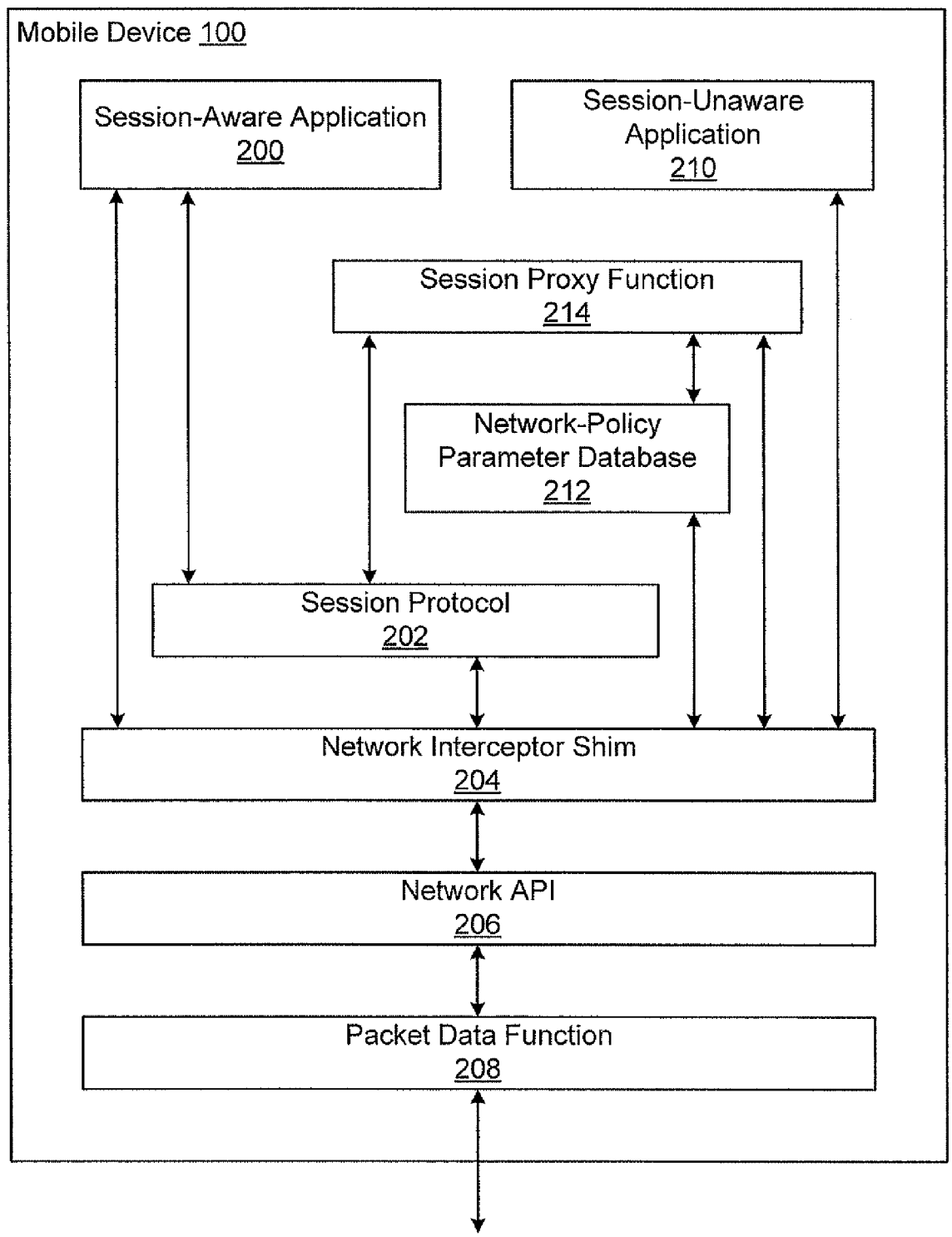
FIG. 2 is a schematic diagram of an exemplary implementation of a mobile device that supports the present invention.

The functional components shown in FIG. 2 illustrate one possible implementation of aspects of the present invention running on the mobile device 100. FIG. 2 is meant to show exemplary information flows and should not be taken as a literal depiction of software and firmware structures on the mobile device 100.

In addition to supporting session-unaware applications 210 according to embodiments of the present invention, the mobile device 100 typically also supports session-aware applications 200. These applications 200 know what network-policy parameters they wish, and they use a session-protocol function 202 to negotiate these parameters over the network with the network policy arbitrator 114 (FIG. 1). The network-policy parameter negotiations and the data of the session-aware applications 200 flow through a stack of network-protocol functions, such as a network API (Application Programming Interface) 206 and a packet data function 208, as is well known in the art of computer communications.

In the schematic of FIG. 2, a network interceptor shim 204 is inserted between the network communications stack and the applications 200 and 210. The network interceptor shim 204 notices when an application 200 or 210 attempts to access the network. The network interceptor shim 204 then queries a network-policy parameter database 212 looking for an entry for the application 200 or 210. If the requesting application is session-aware 200 (typically shown by not having an entry in the network-policy parameter database 212), then the network interceptor shim 204 does nothing more, because the session-aware application 200 handles its own network-policy parameter negotiations.

Figure 3:
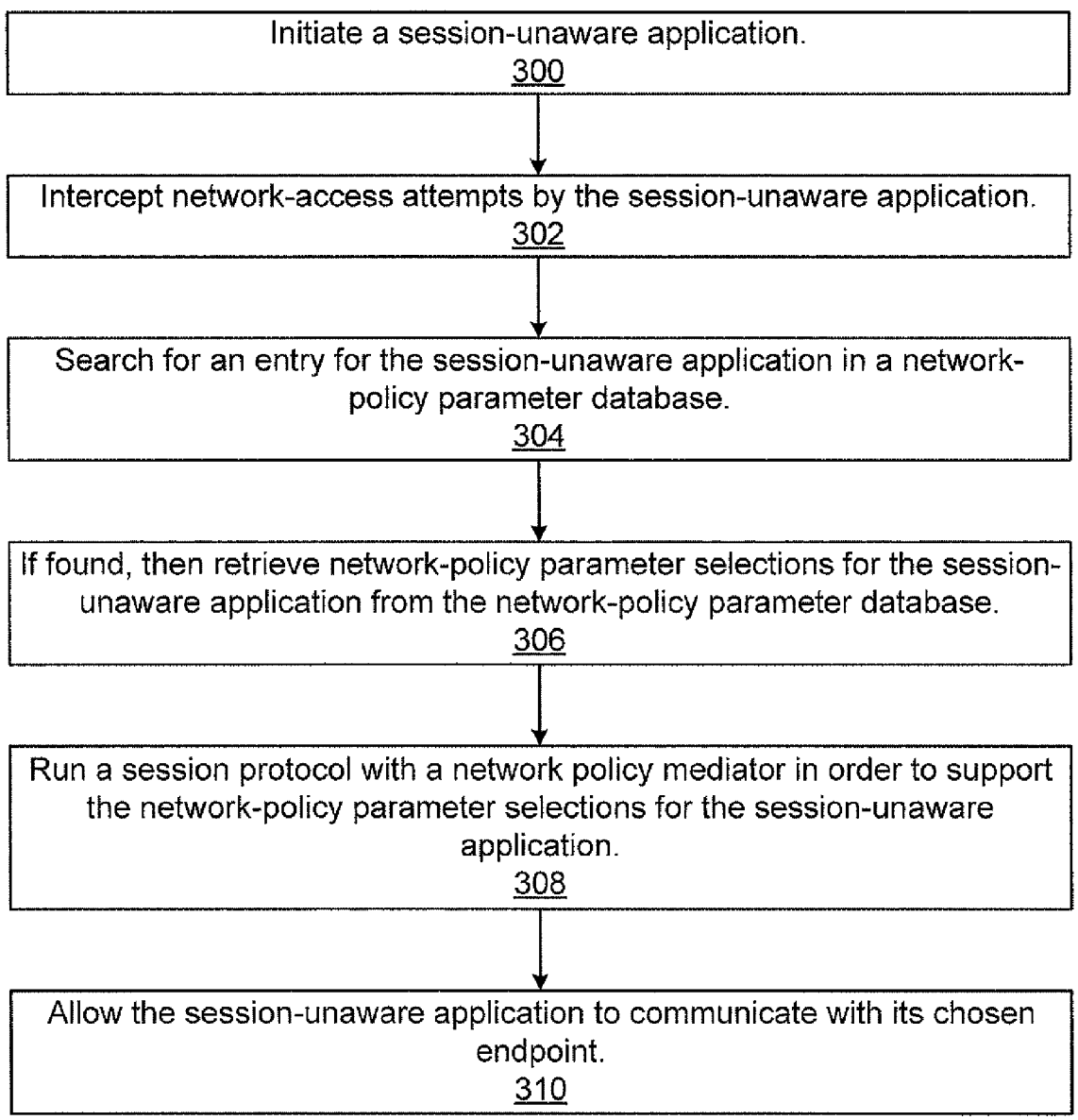
FIG. 3 is a flowchart of an exemplary method for a mobile device to support a session-unaware application.

If, on the other hand, the request for network access is made by a session-unaware application 210, then further action is taken. FIG. 3 presents an overview of the procedure followed by the mobile device 100 when a session-unaware application 210 starts to run (step 300). As with any application 200 or 210, the network interceptor shim 204 intercepts attempts to access the network (step 302). When the network interceptor shim 204 queries the network-policy parameter database 212 (step 304), it finds an entry for the session-unaware application 210. (An example of a network-policy parameter database 212 is discussed below in reference to FIG. 4.) If the network-policy database 212 contains suggested network-policy parameters for the application 210 (step 306), then the session proxy function 214 sends a request for those parameters to the network policy mediator 112 (step 308). In some embodiments, the request is delivered via the Session Initiation Protocol as known in the art. When this set up is complete, application data sent by and to the session-unaware application 210 flow through the network communications stack without interference by the network interceptor shim 204 (step 310).

Thus, the session proxy function 214 performs for the session-unaware application 210 the task of network-policy parameter negotiation that the session-aware application 200 knows how to do for itself. Note that the session-unaware application 210 need not be modified in any way to work with embodiments of the present invention: The session-unaware application 210 runs as it was designed to run without knowledge of network-policy parameters but, because of the present invention, the application 210 reaps the advantages of those parameters.

The network-policy parameter database 212 can be arranged in many different ways. FIG. 4 presents one non-limiting example. Key values 400 are used to index into the network-policy parameter database 212. For example, the session-unaware application 210 whose network-access attempts have been intercepted is compared against the applications listed in the first column 404. In some cases, such as for Application #1 in FIG. 4, there are multiple rows for a given application. Which row to use is determined by further examination. If Application #1 is running the TCP protocol (see column 406), then the first row is used. Many other key values, as known in the art, can be used. In many cases, the application name alone is sufficient, such as for Application #2 and Application #3. In the example network-policy parameter database 212 shown in FIG. 4, a default row is provided that applies to any session-unaware application 210 not explicitly listed. Once the appropriate row is determined, suggested network-policy parameters 402 are retrieved. In this simple example, a bandwidth 410 and a QoS category 412 (related to reliability of delivery) are given as appropriate for each row. Many other network-policy parameters are known in the art and may be used in the database 212.

A session-unaware application 210 would not know how to specify network-policy parameters appropriate for its use. In some cases, therefore, experts analyze a session-unaware application 210 and determine which network-policy parameters would be of greatest benefit to it. This information is then downloaded to the network-policy parameter database 212 on the mobile device 100. Updated information can be given to all subscribing mobile devices 100 whenever the updates become available, or a particular mobile device 100 can download only the information relevant to those session-unaware applications 210 that are of interest to its user. In some embodiments, the network-policy parameter database 212 is kept up-to-date via the Open Mobile Alliance Device Management Protocol or via the Session Initiation Protocol subscribe/notify method.

Figure 5:
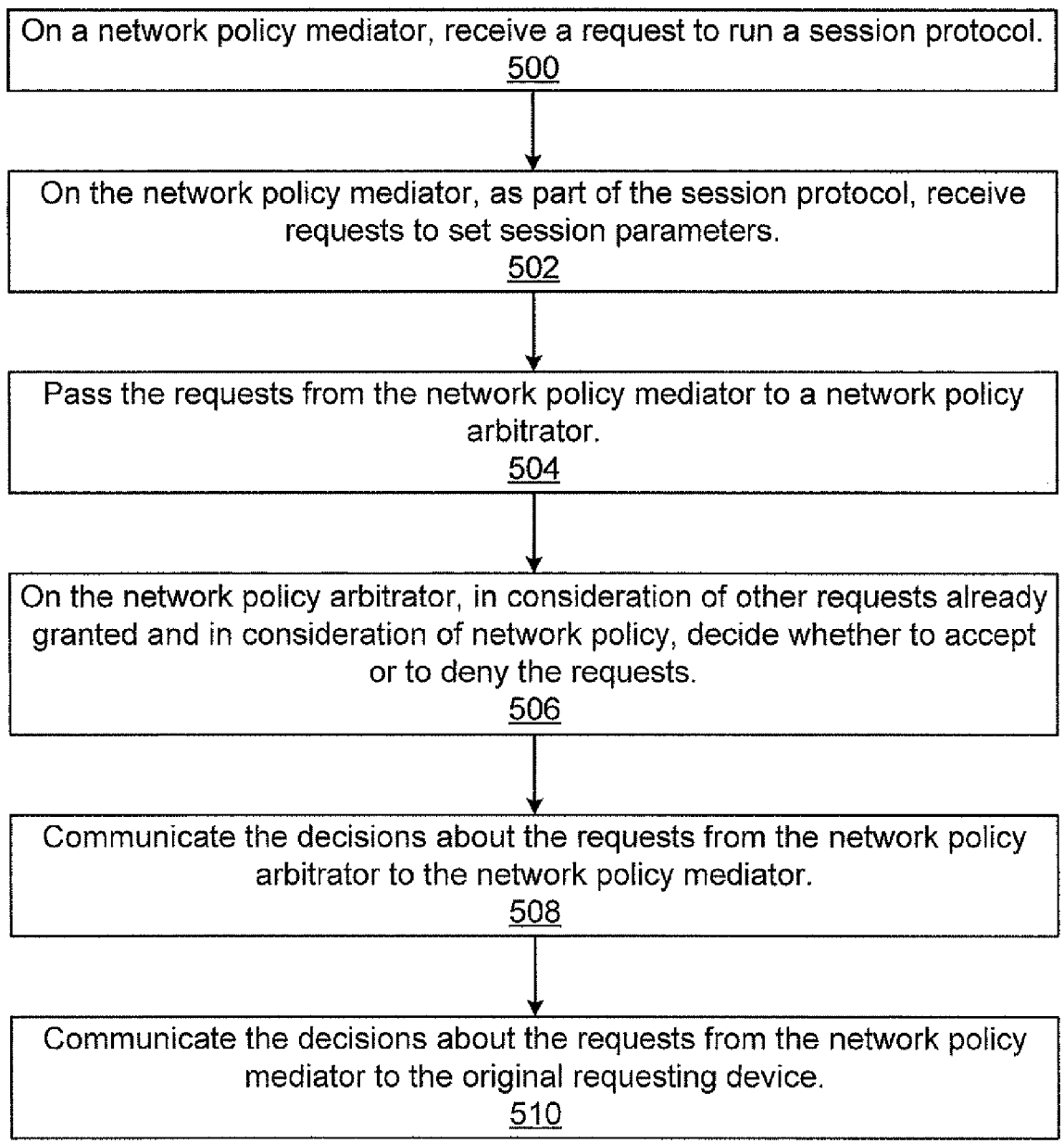
FIG. 5 is a flowchart of an exemplary method for a network policy mediator to work with a network policy arbitrator.

After the suggested network-policy parameters 402 are retrieved from the network-policy parameter database 212, the session proxy function 214 sends a request for those parameters 402. (See step 308 of FIG. 3.) FIG. 5 shows what happens to the request. The request is received by the network policy mediator 112 (step 502) and forwarded along to the network policy arbitrator 114 (step 504). The network policy arbitrator 114 analyzes the request, considering network policy determined by administrators of the network and also considering other network-policy requests made either by the same mobile device 100 or by other devices (step 506). In any case, the network policy arbitrator 114 decides what to do with the request (step 506). In some cases, the request must be either accepted as is or denied, but in other cases the network policy arbitrator 114 proposes a compromise position. The decision is then passed on to the network policy mediator 112 (step 508), which in turns passes on the decision to the mobile device 100 (step 510). In small networks, the network policy mediator 112 and the network policy arbitrator 114 can be implemented on the same computing device.

Figure 6B:
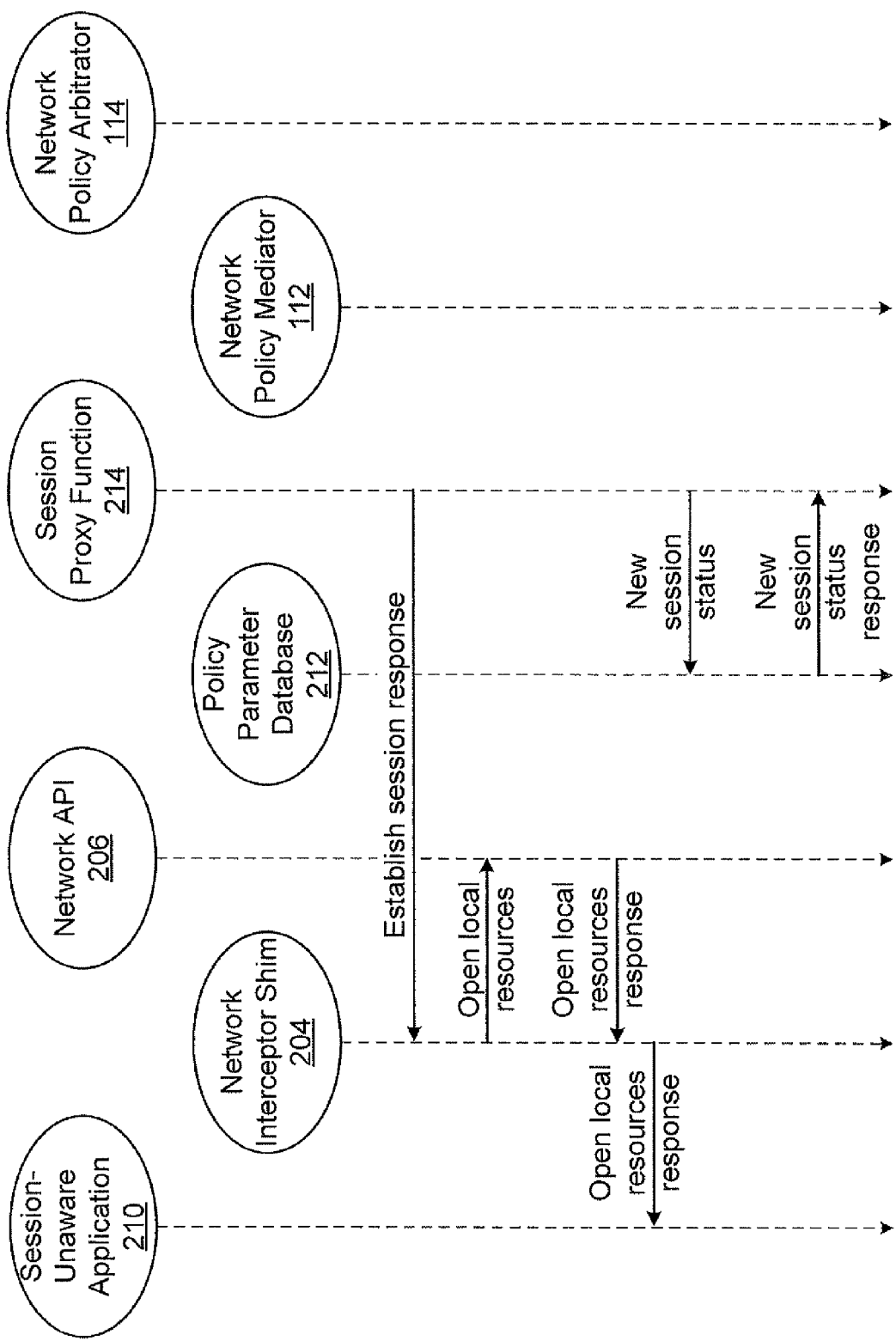

FIGS. 6a and 6b together show how the functional elements described above can communicate in order to reserve network resources for the benefit of a session-unaware application 210. These figures depict stylized information flows that may or may not correspond directly to messages provided by whatever well known protocols are chosen to implement the present invention. In the figures, time flows from the top to the bottom and from FIG. 6a to FIG. 6b.

Beginning at the top of FIG. 6a, when the session-unaware application 210 wishes to access the network, it issues a call to open local resources. This call conforms to an API provided by the operating system of the mobile device 100. That API may be, for example, a BSD sockets interface. The call is intercepted by the network interceptor shim 204 which identifies the session-unaware application 210 making the call. The identification process itself is determined by the operating system of the mobile device 100 and can occur in two steps: The network interceptor shim 204 first obtains the session-unaware application 210's process or task identifier and then uses that identifier to map to an application identifier.

Next, the network interceptor shim 204 queries the network-policy parameter database 212 using the application identifier as a key. The response to this query tells the network interceptor shim 204 whether the session-unaware application 210 could benefit from a session for negotiating network-policy parameters and whether such a session has already been established.

If a session would be beneficial but does not yet exist, then the network interceptor shim 204 asks the session proxy function 214 to establish a session for the benefit of the session-unaware application 210. In some instances, the request to establish a session propagates through several logical entities in the network until it reaches the network policy mediator 112. The session is established between the network policy mediator 112 and the session proxy function 214. Of course, if the network interceptor shim 204 discovers that the session already exists, then the session can be used as follows without establishing it again.

With the session established, the network policy mediator 112 receives the request for network resources (the particulars of this request are stored in the network-policy database 212 as discussed above in reference to FIG. 4) and passes the request along to the network policy arbitrator 114.

The network policy arbitrator 114 considers the network-resource request and passes judgment on it. The request can be denied for any of a number of reasons such as:
- the user associated with the mobile device 100 is not authorized to make this request,
- the user has not agreed to pay for the requested network resources,
- the network resources are not available now because they have been reserved by other requests, or
- the requested resources do not exist in this network.

Assuming that the request for network resources is granted by the network policy arbitrator 114, the response to the request propagates back through the network policy mediator 112 to the network interceptor shim 204 (top of FIG. 6b).

With the network resources now in place, the network interceptor shim 204 now delivers the original request to open local resources along to the network API 206. The response to that request is passed by the network interceptor shim 204 to the session-unaware application 210. At this point, the session-unaware application 210, having made its open local resources request and received its response, is now ready to communicate across the network and will, unbeknownst to itself, benefit by using the network resources reserved for it.

Meanwhile, the status of the session just established is delivered to the network-policy parameter database 212.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details are determined by specific situations, specifically the network protocols and operating-system interfaces used. Therefore, the invention as described herein contemplates all such embodiments as may come within the scope of the following claims and equivalents thereof.

We claim:

1. On a session-aware mobile device running in a wireless network environment, a method for the mobile device to support a session-unaware application, the method comprising:
    on the session-aware mobile device, running the session-unaware application, the session-unaware application configured to transmit and to receive data over the wireless network; and
    on the session-aware mobile device, outside of the session-unaware application:
        retrieving information about the session-unaware application; and
        requesting at least one network policy parameter over the wireless network for negotiating network resources for the session-unaware application, the requesting based, at least in part, on the information retrieved about the session-unaware application.

2. The method for supporting a session-unaware application of claim 1 wherein retrieving information comprises retrieving information from a database on the mobile device.

3. The method for supporting a session-unaware application of claim 2 wherein the database comprises default values for parameters and for session-unaware applications that may be overridden by specific values.

4. The method for supporting a session-unaware application of claim 1 wherein requesting is performed by a session proxy function running on the mobile device.

5. The method for supporting a session-unaware application of claim 1 wherein requesting is based, at least in part, on other applications running on the mobile device.

6. The method for supporting a session-unaware application of claim 1 wherein requesting comprises negotiating a Session Initiation Protocol session.

7. The method for supporting a session-unaware application of claim 1 wherein the at least one network policy parameter is a quality-of-service parameter, the quality-of-service parameter selected from the group consisting of: a minimum bandwidth requirement, a latency requirement, and a delivery reliability requirement.

8. The method for supporting a session-unaware application of claim 1 further comprising:
    intercepting network-access attempts from the session-unaware application.

9. The method for supporting a session-unaware application of claim 1 further comprising:
    downloading from the wireless network information about the session-unaware application.

10. The method for supporting a session-unaware application of claim 9 wherein downloading comprises applying a technique selected from the group consisting of: the Open Mobile Alliance Device Management Protocol and the Session Initiation Protocol subscribe/notify method.

11. A non-transitory computer-readable medium having stored thereon computer-executable instructions for performing a method for a session-aware mobile device running in a wireless network environment to support a session-unaware application, the method comprising:
    on the session-aware mobile device, running the session-unaware application, the session-unaware application configured to transmit and to receive data over the wireless network; and
    on the session-aware mobile device, outside of the session-unaware application:
        retrieving information about the session-unaware application; and
        requesting at least one network policy parameter over the wireless network for negotiating network resources for the session-unaware application, the requesting based, at least in part, on the information retrieved about the session-unaware application.

12. A method for a network policy mediator to support a session-unaware application, the session-unaware application running on a session-aware mobile device in a wireless network environment, the session-unaware application configured to transmit and to receive data over the wireless network; the method comprising:

receiving from the session-aware mobile device a request for at least one network policy parameter for negotiating network resources for the session-unaware application;

forwarding to a network policy arbitrator the request for the at least one network policy parameter;

receiving from the network policy arbitrator a decision as to whether the request is granted or denied; and sending to the session-aware mobile device a response to the request for the at least one network policy parameter, the response based, at least in part, on the decision received from the network policy arbitrator;

wherein the network policy mediator does not receive data from the session-unaware application.

13. The method for supporting a session-unaware application of claim 12 wherein receiving the request comprises negotiating a Session Initiation Protocol session.

14. The method for supporting a session-unaware application of claim 12 wherein the at least one network policy parameter is a quality-of-service parameter, the quality-of-service parameter selected from the group consisting of: a minimum bandwidth requirement, a latency requirement, and a delivery reliability requirement.

15. The method for supporting a session-unaware application of claim 12 wherein the network policy mediator and the network policy arbitrator run on the same computing device.

16. The method for supporting a session-unaware application of claim 12 wherein the response is sent to a session proxy function running on the mobile device.

17. A non-transitory computer-readable medium having stored thereon computer-executable instructions for performing a method for a network policy mediator to support a session-unaware application, the session-unaware application running on a session-aware mobile device in a wireless network environment, the session-unaware application configured to transmit and to receive data over the wireless network; the method comprising:

receiving from the session-aware mobile device a request for at least one network policy parameter for negotiating network resources for the session-unaware application;

forwarding to a network policy arbitrator the request for the at least one network policy parameter;

receiving from the network policy arbitrator a decision as to whether the request is granted or denied; and sending to the session-aware mobile device a response to the request for the at least one network policy parameter, the response based, at least in part, on the decision received from the network policy arbitrator;

wherein the network policy mediator does not receive data from the session-unaware application.

18. A system for supporting a session-unaware application running on a session-aware mobile device in a wireless network environment, the session-unaware application configured to transmit and to receive data over the wireless network, the system comprising:

the session-aware mobile device comprising:
a database storing information about the session-unaware application; and
a session proxy function configured for requesting at least one network policy parameter over the wireless network for negotiating network resources for the session-unaware application, the requesting based, at least in part, on the information about the session-unaware application;

a network policy mediator that does not receive data from the session-unaware application, the network policy mediator configured for:
receiving from the session-aware mobile device a request for the at least one network policy parameter for the session-unaware application;
forwarding to a network policy arbitrator the request for the at least one network policy parameter;
receiving from the network policy arbitrator a decision as to whether the request is granted or denied; and
sending to the session-aware mobile device a response to the request for the at least one network policy parameter, the response based, at least in part, on the decision received from the network policy arbitrator; and the network policy arbitrator configured for deciding whether to grant or to deny the request.

19. The system for supporting a session-unaware application of claim 18 wherein the mobile device further comprises:
a software shim running in a wireless-network-protocol stack on the mobile device that intercepts network-access attempts from the session-unaware application.

20. The system for supporting a session-unaware application of claim 18 wherein the database on the mobile device further comprises default values for parameters and for session-unaware applications that may be overridden by specific values.

21. The system for supporting a session-unaware application of claim 18 wherein the session proxy function is further configured to base its request, at least in part, on other applications running on the mobile device.

22. The system for supporting a session-unaware application of claim 18 wherein the mobile device is further configured for downloading from the wireless network information about the session-unaware application.

23. The system for supporting a session-unaware application of claim 18 wherein the network policy mediator and the network policy arbitrator run on the same computing device.

* * * * *